(12) United States Patent
Finnigan et al.

(10) Patent No.: US 9,228,561 B2
(45) Date of Patent: Jan. 5, 2016

(54) DEVICE FOR CAPTURING ENERGY FROM AN OSCILLATING DRIVE MEMBER

(75) Inventors: Timothy Donegal Finnigan, Waverley (AU); Gerold Kloos, South Coogee (AU); Carlos Andres Gonzalez Toro, Bondi (AU)

(73) Assignee: BioPower Systems Pty. Ltd., Alexandria, New South Wales (AU)

( * ) Notice: Subject to any disclaimer, the term of this patent is extended or adjusted under 35 U.S.C. 154(b) by 906 days.

(21) Appl. No.: 13/393,265

(22) PCT Filed: Sep. 1, 2010

(86) PCT No.: PCT/AU2010/001121
§ 371 (c)(1),
(2), (4) Date: Apr. 4, 2012

(87) PCT Pub. No.: WO2011/026173
PCT Pub. Date: Mar. 10, 2011

(65) Prior Publication Data
US 2012/0181790 A1    Jul. 19, 2012

(30) Foreign Application Priority Data

Sep. 1, 2009  (AU) ............................... 2009904251

(51) Int. Cl.
*E02B 9/08* (2006.01)
*F03B 13/18* (2006.01)

(52) U.S. Cl.
CPC .......... *F03B 13/1805* (2013.01); *F05B 2240/97* (2013.01); *Y02E 10/28* (2013.01); *Y02E 10/38* (2013.01)

(58) Field of Classification Search
CPC ..... Y02E 10/28; Y02E 10/38; F03B 13/1805; F05B 2240/97

USPC ............ 60/398, 458; 417/319, 315, 332, 334, 417/330; 290/53, 42; 91/54; 92/59, 128
See application file for complete search history.

(56) References Cited

U.S. PATENT DOCUMENTS

| 4,712,471 A | * | 12/1987 | Johnson ............................ 92/24 |
| 4,873,948 A | * | 10/1989 | Richeson et al. ........... 123/90.11 |
| 5,084,630 A | | 1/1992 | Azimi |
| 5,199,857 A | * | 4/1993 | Sanuki ........................... 417/319 |
| 2008/0191485 A1 | * | 8/2008 | Whittaker et al. .............. 290/53 |
| 2009/0026767 A1 | | 1/2009 | Petrounevitch |

FOREIGN PATENT DOCUMENTS

| GB | 2408778 A | 6/2005 |
| WO | 2007/019607 A1 | 2/2007 |
| WO | 2007/019608 A1 | 2/2007 |

* cited by examiner

*Primary Examiner* — Dwayne J White
*Assistant Examiner* — Logan Kraft
(74) *Attorney, Agent, or Firm* — McDonnell Boehnen Hulbert & Berghoff LLP

(57) ABSTRACT

Disclosed herein is a device (10) for capturing energy from ocean waves. The device (10) comprises a base (12) adapted for stationary mounting relative to a fluid flow generated by the ocean waves. A drive member (14) is movably connected relative to the base (12) and adapted to be driven in oscillatory rotational motion relative to the base (12). An array of paddles (14*c*) extend from the drive member (14), such that forces applied to the paddles by the ocean waves drive the drive member in oscillatory rotational motion relative to the base (12), A plurality of removable modular energy transfer mechanisms (20) are associated with the drive member (14) and adapted to be driven by the oscillation of the drive member.

34 Claims, 15 Drawing Sheets

DEVICE FOR CAPTURING ENERGY FROM AN OSCILLATING DRIVE MEMBER

This application is a US national phase of International Application No. PCT/AU2010/001121 filed on Sep. 1, 2010, the disclosure of which is incorporated herein by reference in its entirety.

The present disclosure relates to a modular energy transfer mechanism and a device for capturing energy from a moving fluid including same.

The device disclosed has been developed primarily for use in capturing energy from ocean waves, tidal flows or fast-flowing rivers or streams. However, it will be appreciated that the device may also be used to capture energy from air flows, such as wind, or from exhaust flows, or indeed from any source that can be made to impart an oscillating force onto a shaft.

A number of hydro-energy capturing devices are disclosed in the Applicant's co-pending International Patent Application Nos. PCT/AU2006/001148 (Publication No. WO2007/019607) and PCT/AU2006/001149 (Publication No. WO2007/019608), the disclosures of which are incorporated herein in their entirety by way of reference. The devices disclosed in these earlier applications are, respectively, for use in fast-flowing streams to drive an arm in oscillation about a generally vertical axis, and for use in oceans where ocean wave action drives a paddle, having an array of blades, in oscillation about a generally horizontal axis.

Other hydro-energy capturing devices are also known, for example from AU746011, which discloses a prime mover for extracting power from a current of water, the prime mover having a control member for periodically reversing the direction of thrust on a body to cause the body to oscillate, along with means for extracting power from the oscillation of the body.

A problem with such known hydro-energy devices is that maintenance or repairs of their working parts can be time consuming and expensive. Typically, maintenance and repairs must be conducted in-situ, meaning that divers are required, which can be dangerous and, again, expensive. Also, since the maintenance typically must be conducted underwater, internal components of the hydro-energy devices that are usually isolated from the water may undesirably need to be wet during the servicing or maintenance. Moreover, any tools used by the divers must be waterproof, again leading to additional expense. Also, the device must typically be inactive during maintenance and repairs, undesirably resulting in downtime during which energy cannot be extracted/captured.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

In a first aspect, there is provided a device for capturing energy from a moving fluid, said device comprising:
 a base adapted for stationary mounting relative to a fluid flow;
 a drive member movably connected to said base and adapted to be driven in oscillatory motion relative to said base;
 at least one paddle connected relative to the drive member, wherein fluid flow past the paddle drives the drive member in oscillatory motion relative to the base;
 at least one removable modular energy transfer mechanism associated with said drive member and adapted to be driven by the oscillation of said drive member.

The oscillatory motion of the drive member may be oscillatory rotational motion about a first axis.

The device may comprise a plurality of modular energy transfer mechanisms. The modular energy transfer mechanisms may be independent, such that the device can continue to transfer energy provided that at least one of the energy transfer mechanisms is operable and installed.

An interface between the at least one modular energy transfer mechanism and the drive member may be exposed to the surrounding environment. Environmentally sensitive components of the modular energy transfer mechanism may be sealed from the environment.

The modular energy transfer mechanism may comprise at least one hydraulic cylinder for actuation by oscillatory movement of the drive member. One end of the hydraulic cylinder may be translationally fixed with respect to the base and the other end of the hydraulic cylinder may be hingedly connected to a movable member that is adapted to move by oscillation of the drive member. The hydraulic cylinder may be at least partially housed in a pressure vessel. An accumulator may be associated with the hydraulic cylinder, such that actuation of the hydraulic cylinder may pressurise a fluid in the accumulator. The accumulator may be connected to a generator and pressure from the accumulator may be released to power the generator to generate electricity. The generator may be actuated by a hydraulic motor that is actuated by release of pressure from the accumulator. A control valve may be provided for controlling release of pressure from the accumulator to the hydraulic motor. The control valve may be adapted to provide a substantially constant hydraulic power flow to the hydraulic motor.

An oscillatible coupling may extend from the movable member to connect the movable member to the drive member, such that oscillation of the drive member oscillates the movable member about the first axis, Two of the hydraulic cylinders may be provided, each connected at one end to a respective diametrically opposite side of the movable member. A clutch may be provided between the drive member and the hydraulic cylinder(s) to allow the hydraulic cylinder(s) to be disengaged from the drive member. Two of the couplings may be provided, each extending from an opposite side of the pressure vessel. The coupling(s) may be directly engaged with the drive member or may be engaged with the drive member by a coupling of an adjacent modular energy transfer mechanism or by an adapter. During oscillation of the movable member, the coupling is adapted to rotate relative to the pressure vessel. A rotary seal is provided between the pressure vessel and the coupling. The pressure vessel may be fixed relative to the base. A plurality of the modular energy transfer mechanisms may be connected to the drive member in series.

Alternatively, the modular energy transfer mechanism may comprise a locking mechanism, which may extend from the pressure vessel, for selectively engaging a portion of the drive member spaced apart from the first axis. The movable member may comprise a mounting member fixed relative to the locking mechanism. The mounting member may be located inside the pressure vessel. Two of the hydraulic cylinders may be provided. The translationally fixed end(s) of the hydraulic cylinder(s) may extend from the pressure vessel. A seal may be provided between the pressure vessel and the hydraulic cylinder(s). The pressure vessel may be hingedly connected relative to the base. The pressure vessel may be hingedly connected relative to the base about the first axis. A plurality of the modular energy transfer mechanisms may be connected to the drive member in parallel.

The modular energy transfer mechanism may be buoyant in water, such that in underwater applications it may selectively be released from the drive member and allowed to float to a surface of the water. The buoyancy of the modular energy transfer mechanism may be variable, for example by selectively at least partially flooding the modular energy transfer mechanism with a liquid and evacuating at least some of the liquid from the modular energy transfer mechanism. Oscillation of the drive member may pump at least some of the liquid from the modular energy transfer mechanism to increase its buoyancy. Alternatively, a compressed gas supply in the modular energy transfer mechanism may be selectively released to displace at least some of the liquid and increase the buoyancy of the modular energy transfer mechanism. The liquid may be water.

A pulley may be provided on the base of the energy capturing device. A guide wire may be looped around the pulley, have one end attached to the modular energy transfer mechanism and an opposite end attached to a prime mover for drawing the guide wire around the pulley to draw the modular energy transfer mechanism toward the base.

The base, drive member and paddle may be adapted to be substantially maintenance-free, or at least to require servicing at intervals much greater than those of the modular energy transfer mechanism.

The device for capturing energy from an oscillating drive member may be adapted for underwater use to capture energy from moving water.

In a second aspect, there is provided a modular energy transfer mechanism for a device for capturing energy from an oscillating drive member, the modular energy transfer mechanism comprising:

at least one hydraulic cylinder for actuation by oscillatory movement of the drive member, one end of the hydraulic cylinder being adapted for translationally fixed mounting and the other end of the hydraulic cylinder being adapted for hinged connection to a movable member that is adapted to move by oscillation of the drive member; and a mechanism for disassociating the hydraulic cylinder from the drive member, such that, when so disassociated, oscillation of the drive member does not actuate the hydraulic cylinder.

The hydraulic cylinder may be at least partially housed in a pressure vessel. An accumulator may be associated with the hydraulic cylinder, such that actuation of the hydraulic cylinder may pressurise a fluid in the accumulator. The accumulator may be connected to a generator and pressure from the accumulator may be released to power the generator to generate electricity. The generator may be actuated by a hydraulic motor that is actuated by release of pressure from the accumulator. A control valve may be provided for controlling release of pressure from the accumulator to the hydraulic motor. The control valve may be adapted to provide a substantially constant hydraulic power flow to the hydraulic motor.

An oscillatible coupling may extend from the movable member to connect the movable member to the drive member, such that oscillation of the drive member oscillates the movable member about the first axis. Two of the hydraulic cylinders may be provided, each connected at one end to a respective diametrically opposite side of the movable member. A clutch may be provided between the drive member and the hydraulic cylinder(s) to allow the hydraulic cylinder(s) to be disengaged from the drive member. Two of the couplings may be provided, each extending from an opposite side of the pressure vessel. The coupling(s) may be directly engageable with the drive member or may be engageable with the drive member by a coupling of an adjacent modular energy transfer mechanism or by an adapter. During oscillation of the movable member, the coupling is adapted to rotate relative to the pressure vessel. A rotary seat is provided between the pressure vessel and the coupling. The pressure vessel may be adapted for translationally fixed mounting. The modular energy transfer mechanism may be connectable in series to one or more others of the modular energy transfer mechanisms.

Alternatively, the modular energy transfer mechanism may comprise a locking mechanism, which may extend from the pressure vessel, for selectively engaging a portion of the drive member spaced apart from a first axis about which the drive member rotationally oscillates. The movable member may comprise a mounting member fixed relative to the locking mechanism. The mounting member may be located inside the pressure vessel. Two of the hydraulic cylinders may be provided. The translationally fixed end(s) of the hydraulic cylinder(s) may extend from the pressure vessel. A seal may be provided between the pressure vessel and the hydraulic cylinder(s). The pressure vessel may be adapted for hinged connection relative to a fixed base. The pressure vessel may be hingedly connected relative to the base about the first axis. The modular energy transfer mechanism may be connectable in parallel to one or more others of the modular energy transfer mechanisms.

Embodiments of the present disclosure will now be described, by way of example only, with reference to the accompanying drawings, in which.

Figure 1:
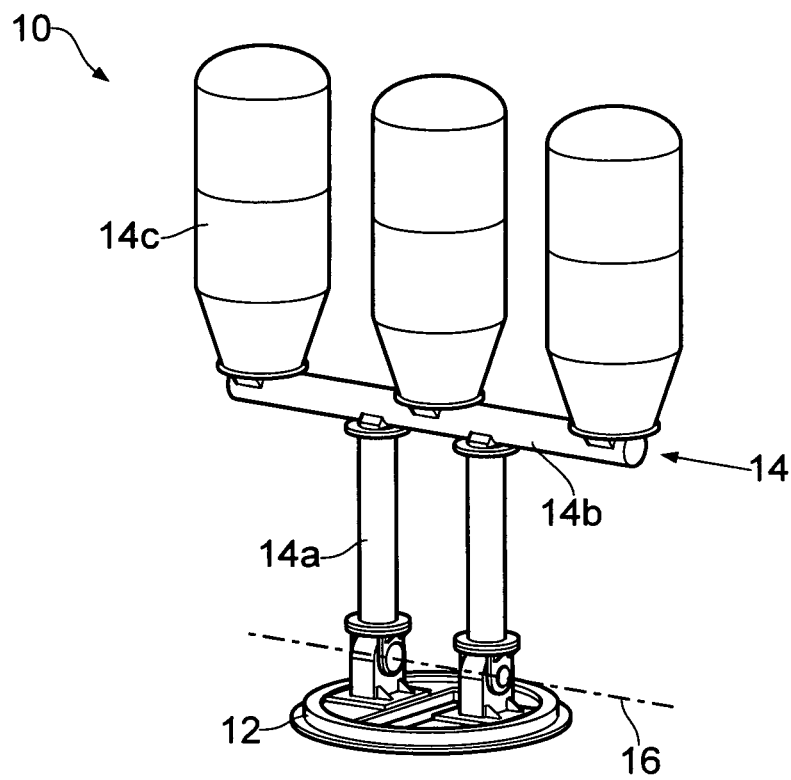
FIG. 1 is a perspective view of an embodiment of a submersible device for capturing energy from an oscillating drive member driven by moving water.
Figure 6:
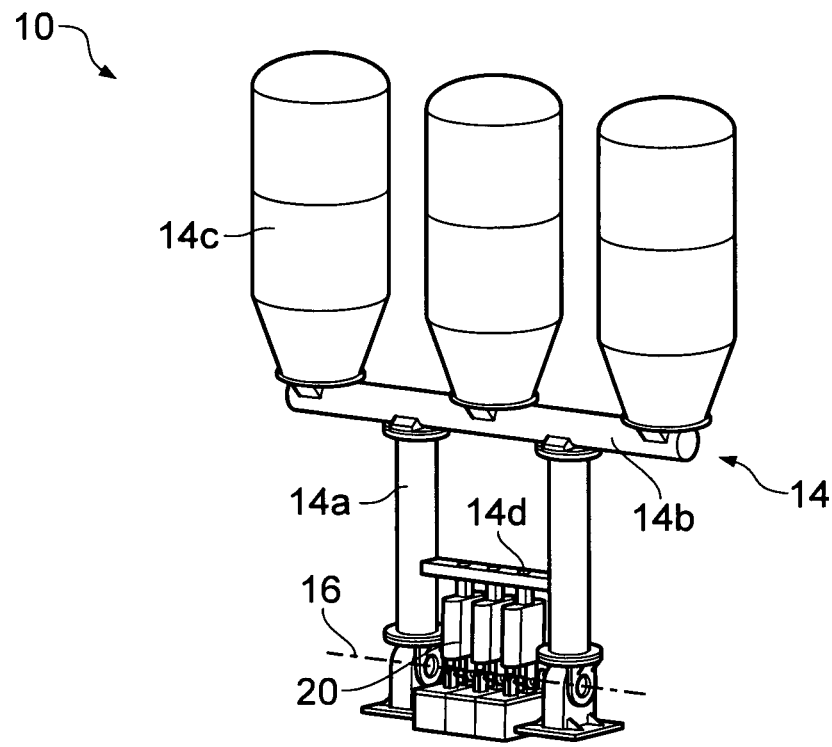
Figure 7:
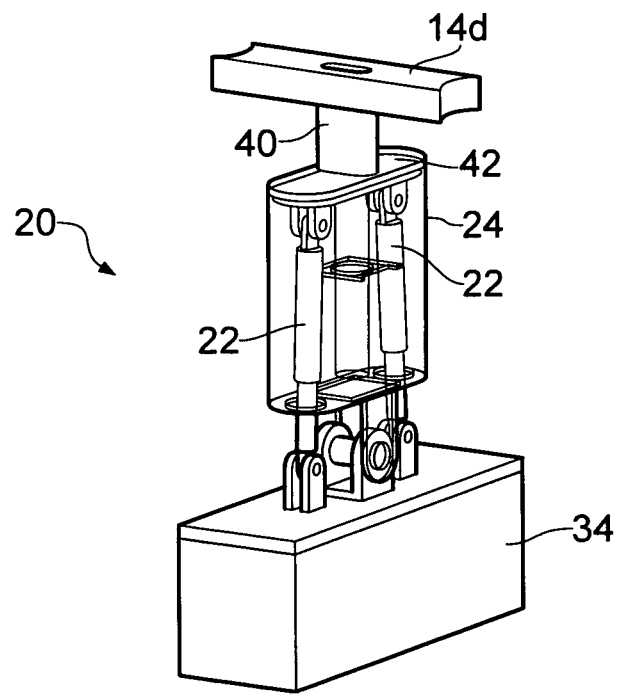

FIG. 5 schematically illustrates the process for installing a modular energy transfer mechanism in the device of FIG. 1;

FIG. 6 is a perspective view of the device of FIG. 1 with three modular energy transfer mechanisms according to a second embodiment installed; and FIG. 7 is an enlarged view of one of the modular energy transfer mechanisms of FIG. 6.

Figure 8:
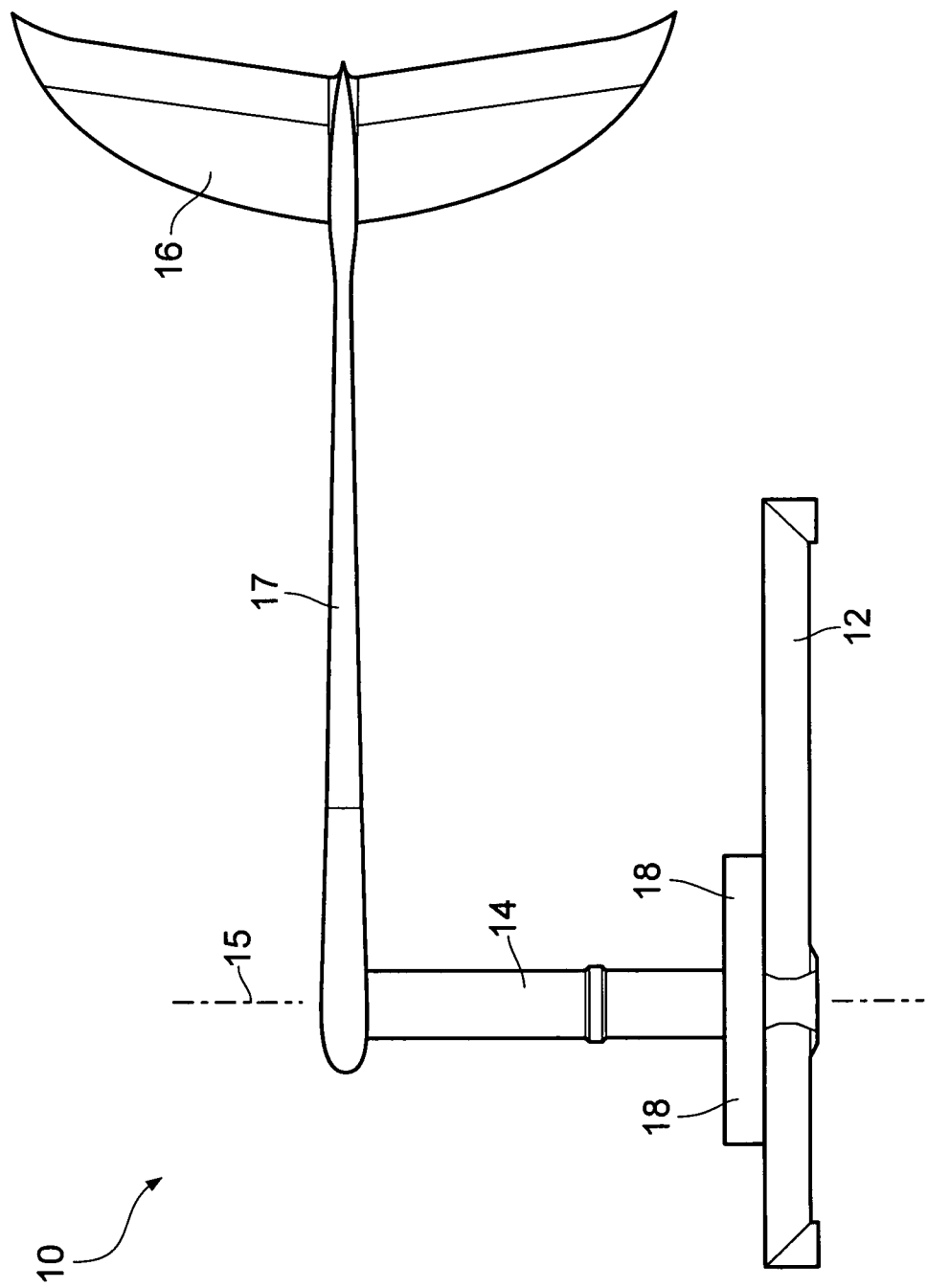
Figure 9:
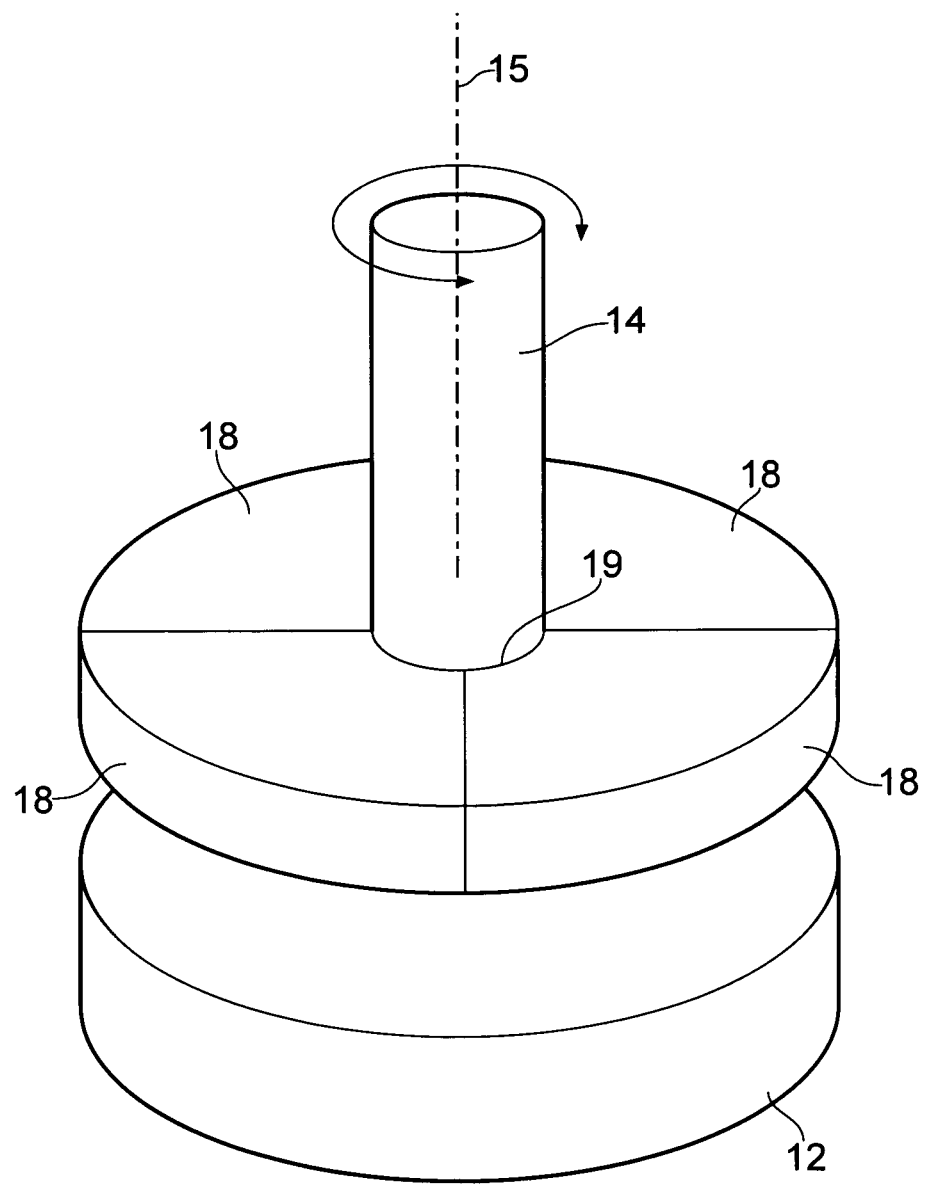
Figure 10:
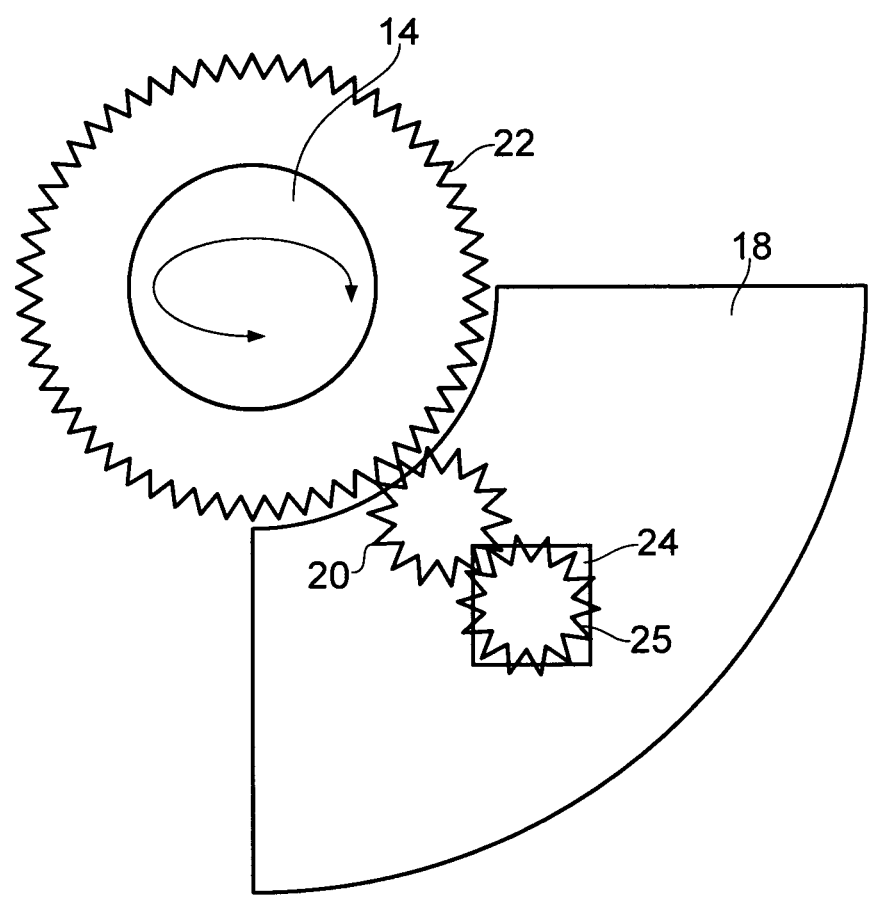
Figure 11:
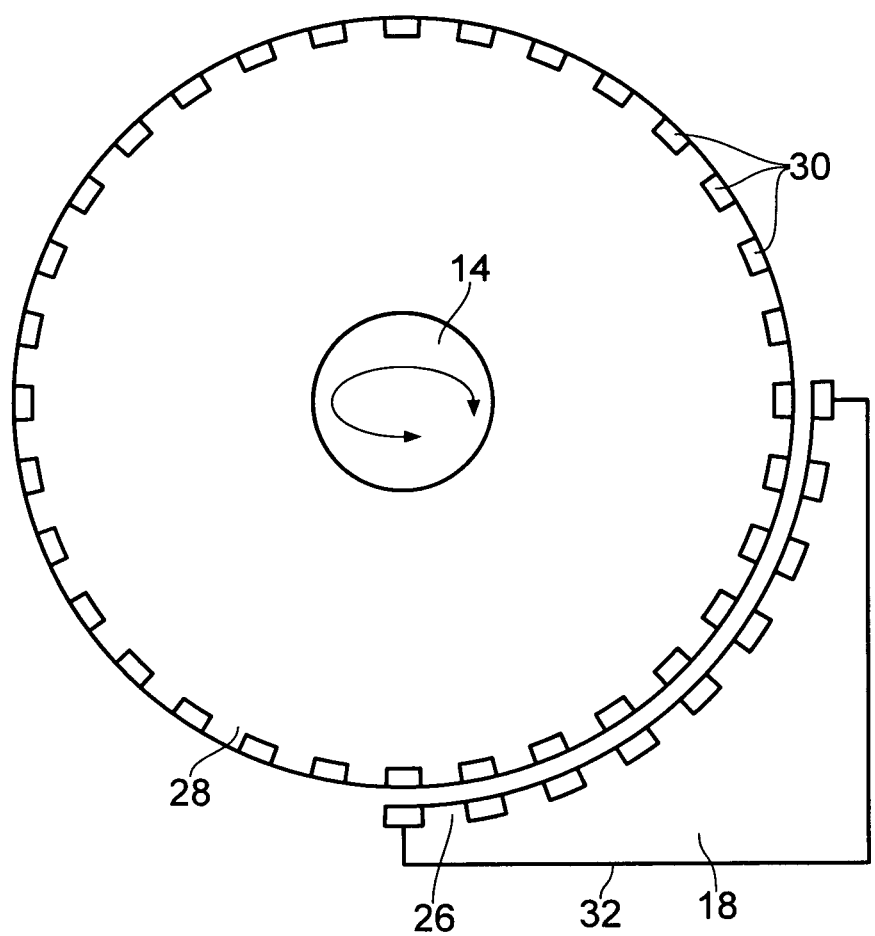
Figure 12:
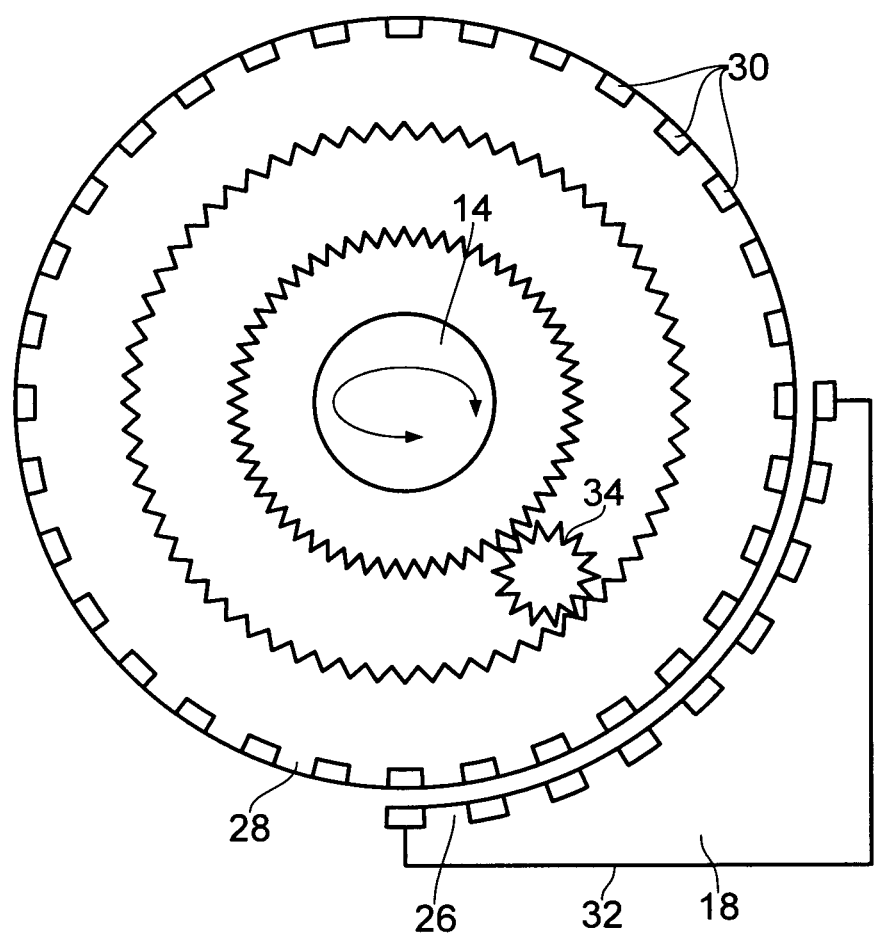
Figure 12A:
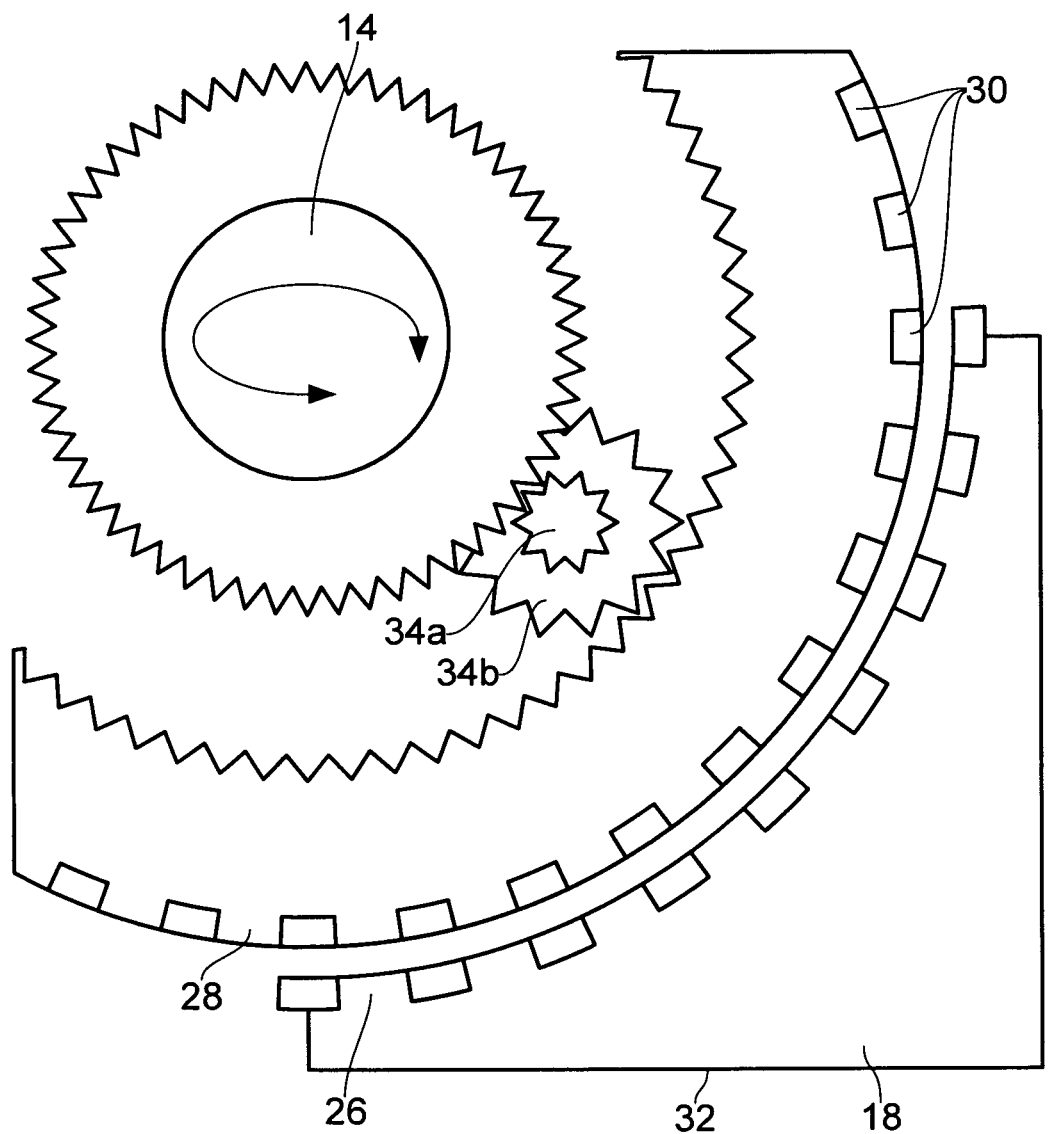
Figure 13:
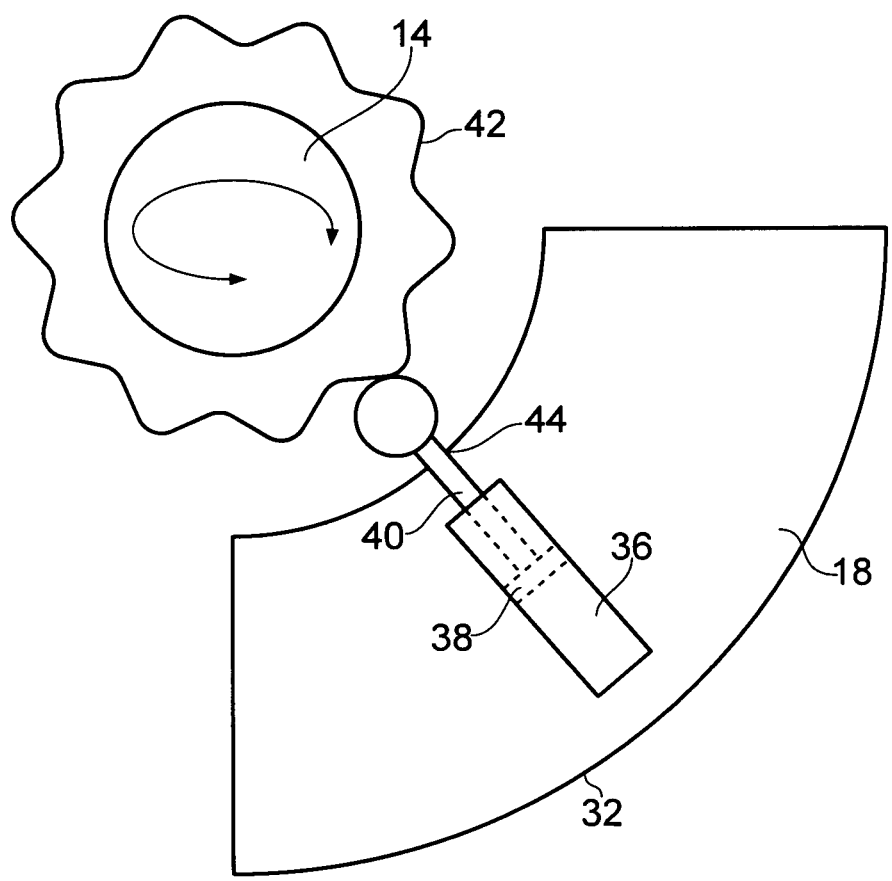
Figure 14:
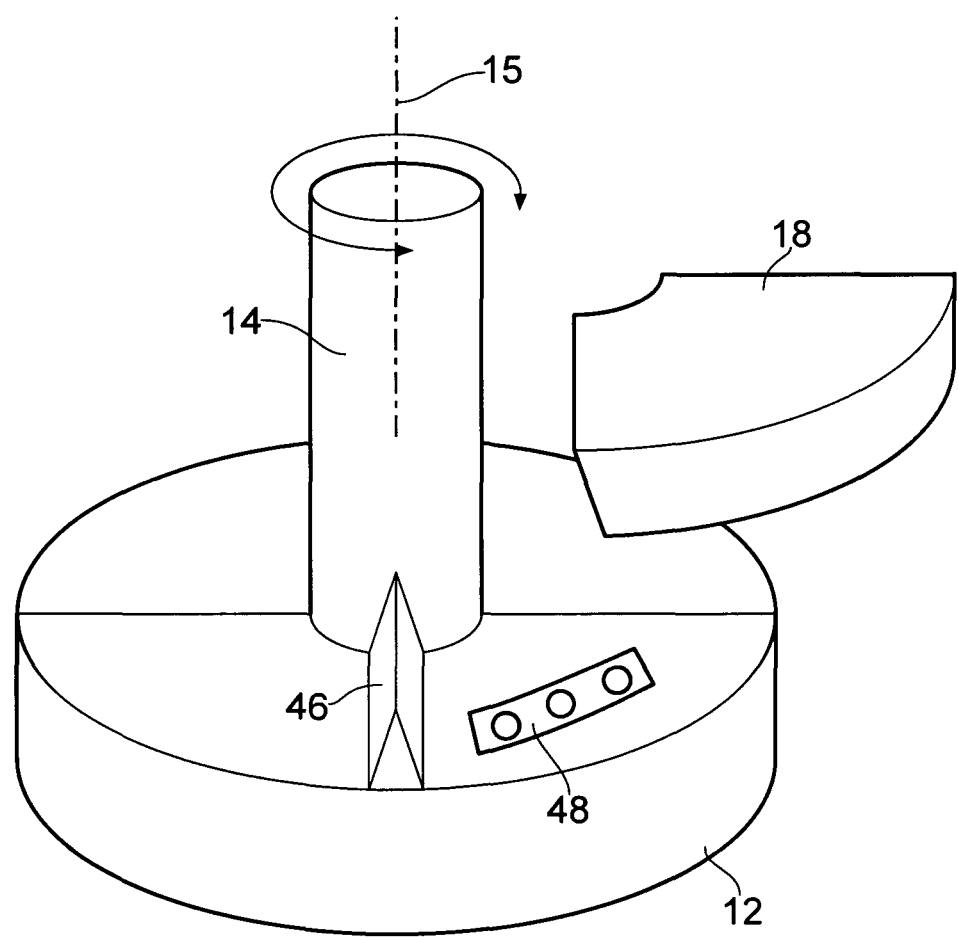
Figure 15:
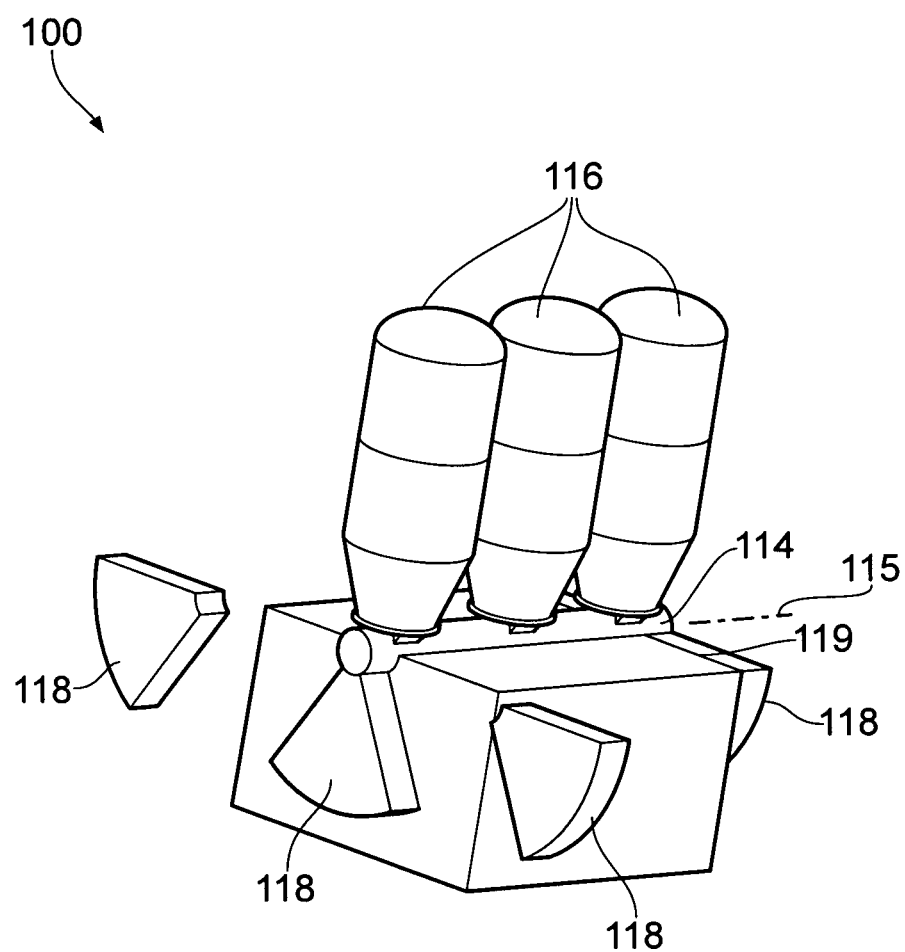
Figure 16:
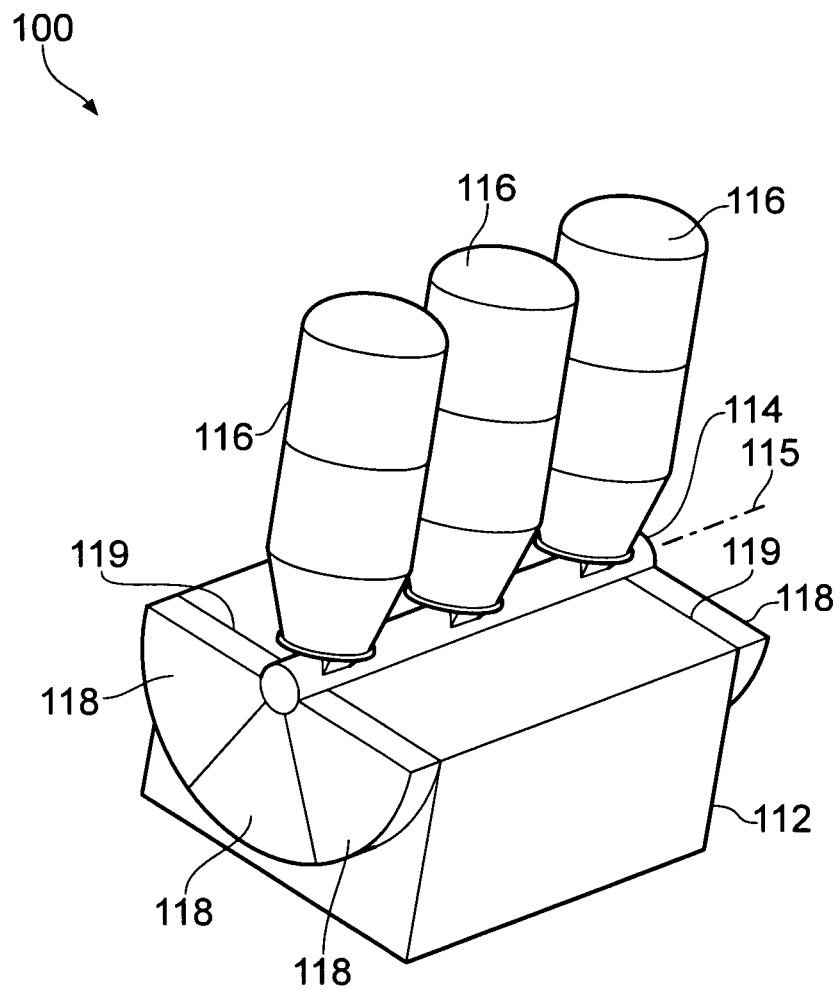
Figure 17:
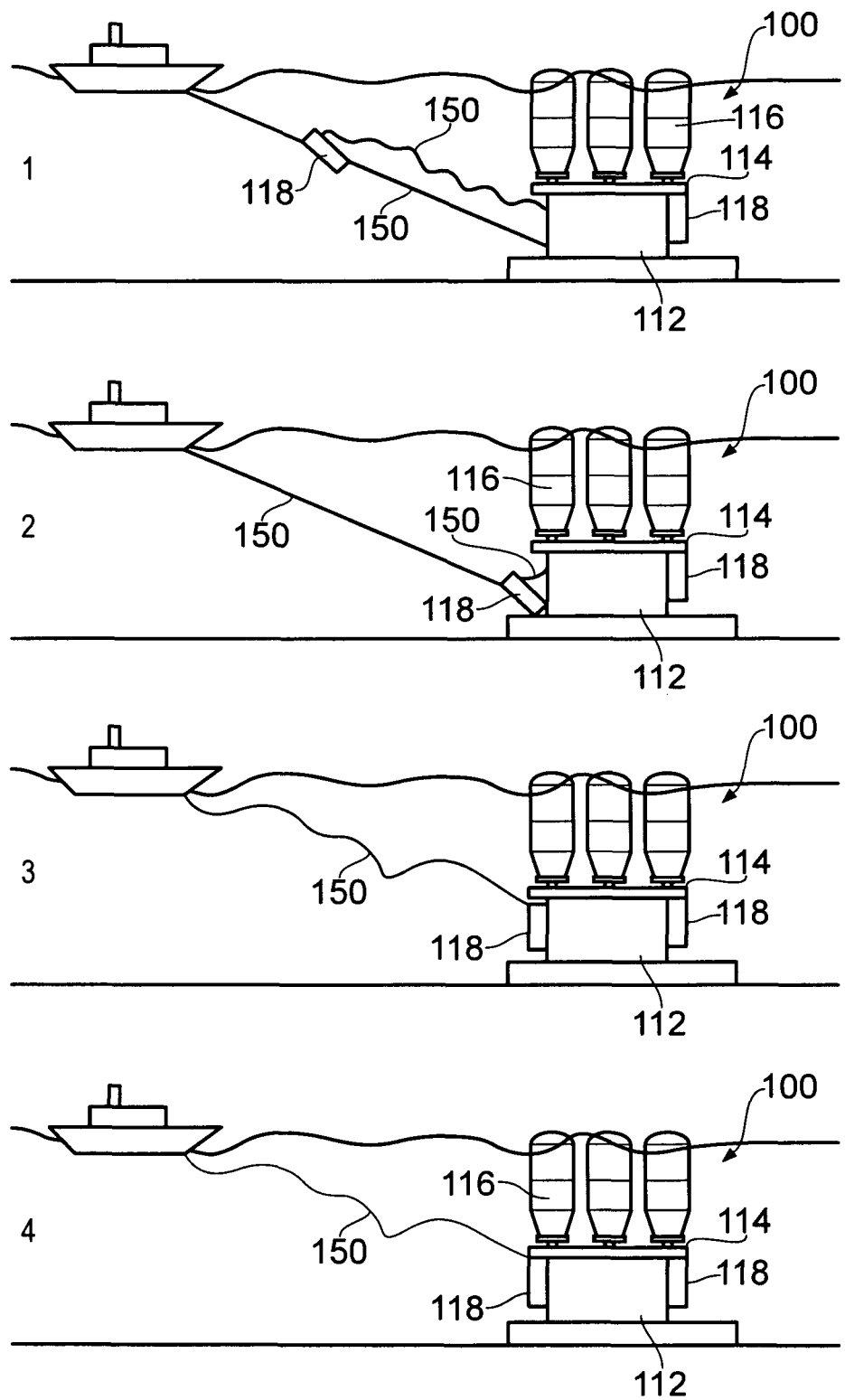

FIG. 8 is a schematic side view of an alternative embodiment of a submersible device for capturing energy from an oscillating drive member driven by moving water;

FIG. 9 is an enlarged perspective view of the circled portion of FIG. 8;

FIG. 10 is a schematic plan view of a first embodiment for associating the modular energy transfer mechanism and drive member of the device of FIG. 8;

FIG. 11 is a schematic plan view of a second embodiment for associating the modular energy transfer mechanism and drive member of the device of FIG. 8;

FIG. 12 is a schematic plan view of a third embodiment for associating the modular energy transfer mechanism and drive member of the device of FIG. 8;

FIG. 12a shows a modified version of the third embodiment of FIG. 12;

FIG. 13 is a schematic plan view of a fourth embodiment for associating the modular energy transfer mechanism and drive member of the device of FIG. 1;

FIG. 14 is a schematic view of a docking arrangement for the device of FIG. 1;

FIG. 15 is a schematic perspective view of a second embodiment of a submersible device for capturing energy from an oscillating drive member driven by moving water, with two of the modular energy transfer mechanisms shown disassociated from the drive member;

FIG. 16 is a schematic perspective view of the device of FIG. 15, with all of the modular energy transfer mechanisms associated with the drive member; and FIG. 17 shows a method for installing a modular energy transfer mechanism in the device of FIG. 15.

Referring initially to FIG. 1, there is shown a device 10 for capturing energy from ocean waves. The device 10 comprises a base 12 adapted for stationary mounting relative to a fluid flow generated by the ocean waves. A drive member 14 is movably connected relative to the base 12 and adapted to be driven in oscillatory rotational motion relative to the base 12, about a first axis 16. The drive member 14 comprises a pair of spaced apart legs 14a having distal ends interconnected by a cross member 14b and proximal ends hingedly connected, about the first axis 16, to the base 12. An array of paddles 14c are connected to and extend from the cross member 14b, such that forces applied to the paddles 14c by the ocean waves drive the drive member 14 in oscillatory rotational motion relative to the base 12. A more complete description of the interaction of ocean waves with the device 10 may be found in the Applicant's earlier International Patent Publication No. WO2007/019608, the entire disclosure of which is incorporated herein by way of reference.

Figure 2:
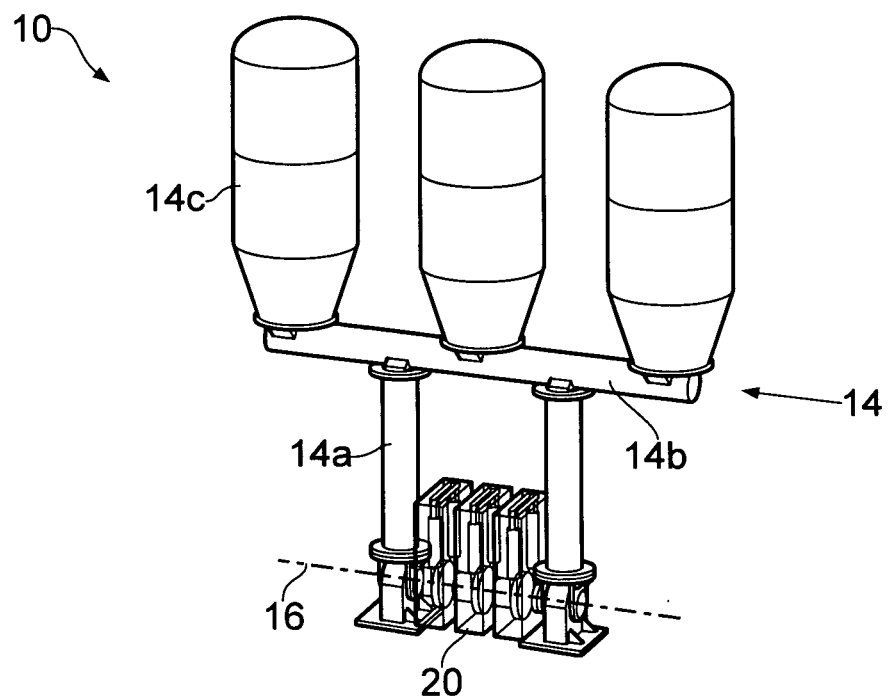
FIG. 2 is a perspective view of the device of FIG. 1 with three modular energy transfer mechanisms according to a first embodiment installed.

As shown in FIG. 2, a plurality of removable modular energy transfer mechanisms 20 are associated with the drive member 14 and adapted to be driven by the oscillation of the drive member 14. The modular energy transfer mechanisms 20 are connected in series. If one of the modular energy transfer mechanisms 20 is removed, for example for servicing or replacement, a bridging adapter (not shown) is installed to bridge a gap in the drive chain created by the missing the modular energy transfer mechanism. Alternatively, a replacement modular energy transfer mechanism may be slotted into the drive chain to bridge the gap.

The modular energy transfer mechanisms 20 each comprises a pair of hydraulic cylinders 22 for actuation by oscillatory movement of the drive member 14. The hydraulic cylinders 22 are housed in a pressure vessel 24 that is adapted for fixed connection relative to the base 12. The upper end of each hydraulic cylinder 22 is translationally fixed with respect to the base 12, by being connected to a mounting member 26 mounted the pressure vessel 24, and the lower end of each hydraulic cylinder 22 is hingedly connected to a movable member 28 that is adapted to rotationally oscillate about the first axis 16 due to oscillation of the drive member 14. The lower end of each hydraulic cylinder 22 is connected to a respective diametrically opposite side of the movable member 28. In the embodiments shown in FIGS. 2 and 3, oscillatible couplings 30a extend from opposite axial sides of the movable member 28 for connecting the movable member 28 to the drive member 14, to a corresponding coupling 30b of an adjacent modular energy transfer mechanism 20, or to a bridging, adapter (not shown), and thereby to the drive member 14. A clutch 32 is provided in the drive train between the drive member 14 and the hydraulic cylinders 22, and more specifically between the couplings 30a and the movable member 28, to allow the hydraulic cylinders 22 to be operatively disengaged from the drive member 14. The couplings 30a each extend from an opposite side of the pressure vessel 24. During oscillation of the drive member 14, the couplings 30a are adapted to rotate relative to the pressure vessel 24. A rotary seal is provided between the pressure vessel 24 and the couplings 30a. Accordingly, any environmentally sensitive components inside the pressure vessel 30a are sealed from the surrounding aquatic environment.

One or more accumulators are provided in a generator unit 34 associated with the hydraulic cylinders 22, such that actuation of the hydraulic cylinders 22 pressurises a fluid in the accumulator(s). Pressure from the accumulator(s) is released under the control of a control valve to actuate a hydraulic motor, which in turn actuates a generator in the generator unit 34 to generate electricity. The control valve is adapted to provide a substantially constant hydraulic power flow to the hydraulic motor.

The base 12 and drive member 14 of the device 10 are adapted to be substantially maintenance-free, or at least to require servicing at intervals much greater than those of the modular energy transfer mechanisms 20.

The modular energy transfer mechanisms 20 may be buoyant in water, such that in underwater applications they may selectively be released from the base 12 and drive member 14 and allowed to float to a surface of the water. The buoyancy of the modular energy transfer mechanisms 20 may be variable, for example by selectively at least partially flooding the modular energy transfer mechanisms with water and evacuating at least some of the water from the modular energy transfer mechanisms. Oscillation of the drive member 14 may pump at least some of the water from the modular energy transfer mechanisms 20 to increase their buoyancy. Alternatively, a compressed gas supply in the modular energy transfer mechanisms 20 may be selectively released to displace at least some of the water and increase the buoyancy of the modular energy transfer mechanisms.

Figure 5B:
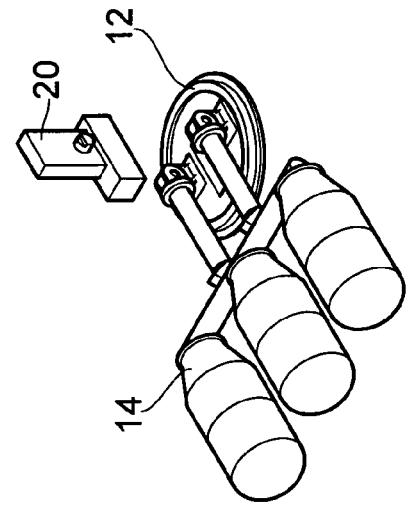
Figure 5D:
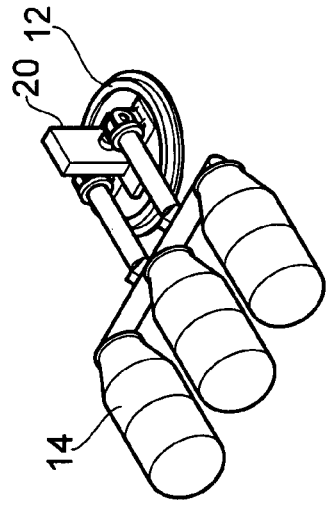
Figure 5A:
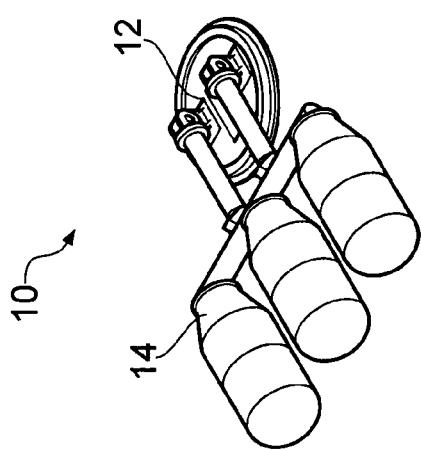
Figure 5C:
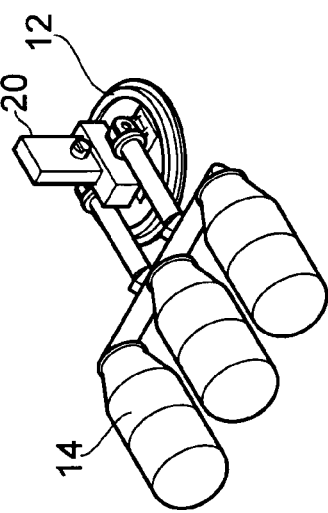

To connect or disconnect a modular energy transfer mechanism 20 to or from the device 10, the device is first lowered into its flat "survival mode" configuration, as shown in FIG. 5(a), in which wave forces on the device 10 are minimised. FIGS. 5(b) to 5(d) show successive stages of the installation procedure. The modular energy transfer mechanism 20 to be installed is inserted from the top of the device 10, between legs 14a. Once the modular energy transfer mechanism 20 has been inserted, it is locked to the base 12 via suitable fasteners, such as by bolting or latching. A survival mode locking mechanism (not shown) mounted on the base 12 holds the drive member 14 in the horizontal position during installation or removal of a modular energy transfer mechanism 20.

To lower the modular energy transfer mechanism 20 toward the base 12 for installation, one end of a guide wire is connected to the modular energy transfer mechanism. The guide wire is fed through a pulley (not shown) on the base 12 and has its opposite end connected to a prime mover, such as a boat or winch, to tension the guide wire and draw the modular energy transfer mechanism 20 down onto the base 12.

The above described installation procedure is identical regardless of whether the device 10 has a single modular energy transfer mechanism 20 or several modular energy transfer mechanisms 20.

Figure 3:
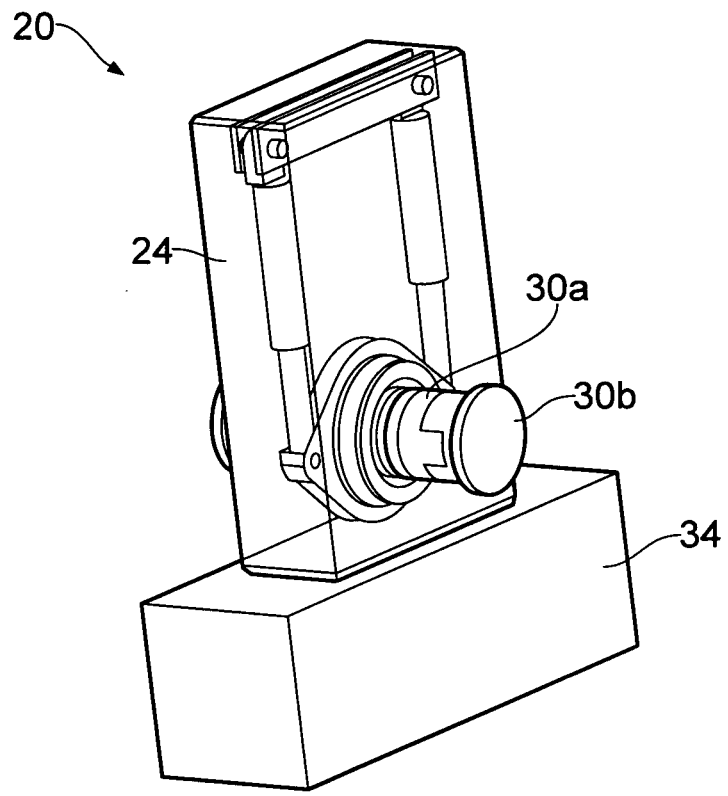
FIG. 3 is an enlarged view of one of the modular energy transfer mechanisms of FIG. 2, shown with the pressure vessel installed.
Figure 4:
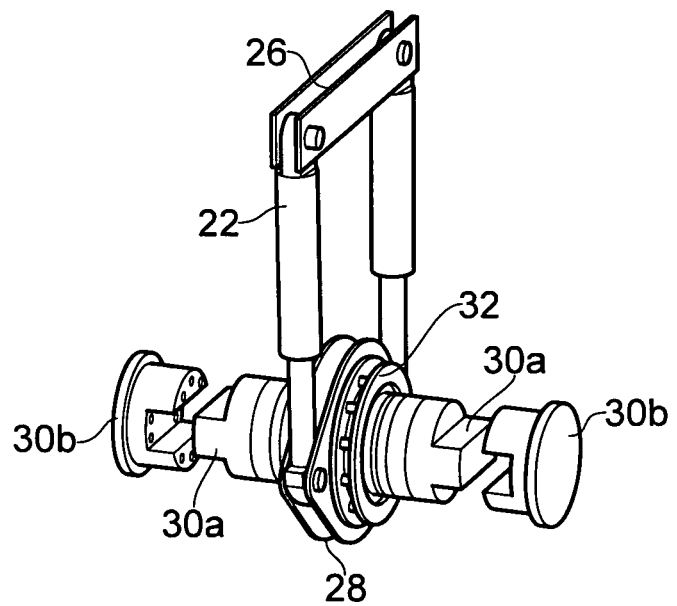
FIG. 4 is an enlarged view of one of the modular energy transfer mechanisms of FIG. 2, shown with the pressure vessel removed to allow internal components to be seen.

FIG. 5(d) shows the device 10 in survival mode, with a modular energy transfer mechanism 20 installed. In this survival mode, the modular energy transfer mechanism 20 is operatively disengaged from the drive member 14. This disengagement is facilitated by releasing the clutch 32, which is shown in FIGS. 3 and 4, and thus disengaging the couplings 30a and hydraulic cylinders 22 from the drive member 14. Disengagement of the drive member 14 from the couplings 30a and hydraulic cylinders 22 allows the drive member 14 to rotate to the horizontal survival mode position without turning the couplings 30a and actuating the hydraulic cylinders 22.

FIG. 6 shows the device 10 with an alternative embodiment of the modular energy transfer mechanisms 20 installed. This embodiment shares many features in common with the first embodiment described above with respect to FIGS. 1-5, where corresponding reference numerals indicate corresponding features with corresponding functions. In the alternative embodiment, however, the modular energy transfer mechanisms 20 comprise a locking mechanism comprising a retractable pin 40, which extends from the pressure vessel 24, for selectively engaging a cross-bar portion 14d of the drive member 14 that extends between legs 14a and is spaced apart from the first axis 16. In the alternative embodiment, the movable member comprises a mounting member 42 fixed relative to the locking mechanism 40. The mounting member 42 is located inside the pressure vessel 24. Again, two of the hydraulic cylinders 22 are provided. The lower ends of the hydraulic cylinders 22, which extend from the pressure vessel 24, are hingedly connected and translationally fixed with respect to the base 12. A seal is provided between the pressure vessel 24 and the hydraulic cylinders 22. The pressure vessel 24 itself is also hingedly connected relative to the base 12 about the first axis 16. Unlike in the first embodiment described with reference to FIGS. 2-5, in the alternative embodiment of FIGS. 6 and 7, the modular energy transfer mechanisms 20 are connected to the drive member 14 in parallel. Accordingly, one or more of the modular energy transfer mechanisms 20 can, be removed from the device 10 for servicing or repair without disrupting the drive train between the drive member 14 and the remaining installed modular energy transfer mechanisms 20. In the embodiment of FIGS. 6 and 7, survival mode is entered by retracting the pin 40 that engages/disengages with the crossbar 14d. This procedure allows the drive member 14 to rotate to the horizontal survival mode position, without moving the modular energy transfer mechanisms 20 or their hydraulic cylinders 22, and leaves the modular energy transfer mechanisms 20 in an upright position. The process for connecting/disconnecting the modular energy transfer mechanisms 20 to the base 12 in the embodiment of FIGS. 6 and 7 is similar to that for the first embodiment described above with reference to FIGS. 5(a) to 5(d).

It will be appreciated that the illustrated water energy capturing device 10 has reduced downtime compared to similar conventional devices, due to the independent and modular nature of the modular energy transfer mechanisms 20, one or more of which can be removed for servicing whilst those remaining continue to operate. The modular nature of the modular energy transfer mechanisms 20 also allows the modular energy transfer mechanisms to be removed to an above-water environment for servicing, which makes servicing much simpler and safer, and obviates the requirement for divers and specialised tools suitable for underwater use. It also allows for a single energy capturing device 10 to be operated with a varied number of modular energy transfer mechanisms 20, thereby allowing the energy transfer to be better matched with the energy source.

It will be appreciated by persons skilled in the art that numerous variations and/or modifications may be made to the specific embodiments described with reference to the drawings without departing from the broad general scope of the present disclosure. The present embodiments are, therefore, to be considered in all respects as illustrative and not restrictive. Examples of potential modifications include, but are not limited to:

the modular energy transfer mechanisms 20 may be adapted to pump or pressurise seawater for the purpose of doing useful work, generating electricity or desalinating seawater;

the device 10 may be adapted to rotationally oscillate about a vertical axis, for example as shown in the Applicant's earlier International Patent Publication No. WO2007/019607, the entire disclosure of which is incorporated herein by way of reference, for capturing energy from rivers, streams, tidal flows, or wind, with the arrangement of the modular energy transfer mechanisms 20 being adjusted accordingly.

Referring now to FIGS. 8-17 of the drawings, there are shown various alternative embodiments of a device 10 for capturing energy from an oscillating drive member. The device 10 is adapted for underwater use to capture energy from moving water, such as fast flowing streams or tidal flows. The device comprises a base 12 adapted for stationary mounting relative to the water flow. A substantially cylindrical drive member 14 is movably connected to the base 12 and is adapted to be driven in oscillatory motion relative to the base 12 about a generally vertical axis 15. A paddle 16 is connected to the drive member 14, via an arm 17, with the angle of the paddle 16 relative to the water flow being adjustable to vary a direction of thrust generated by the flowing water, and thereby to drive the drive member 14 in oscillatory motion relative to the base 12. A plurality of wedge-shaped removable modular energy transfer mechanisms 18 are associated with the drive member 14 and adapted to be driven by the oscillation of the drive member 14. The modular energy transfer mechanisms 18 extend generally perpendicular to the axis 15, with their narrower ends being oriented toward the drive member 14. The modular energy transfer mechanisms 18 are independent, such that the device 10 can continue to transfer energy provided that at least one of the energy transfer mechanisms 18 is operable and installed.

The base 12, drive member 14, paddle 16 and arm 17 are adapted to be substantially maintenance-free, or at least to require servicing at intervals much greater than those of the modular energy transfer mechanisms 18.

An interface 19 between the modular energy transfer mechanisms 18 and the drive member 14 is exposed to the surrounding underwater environment. However, a housing is provided around environmentally sensitive components of the modular energy transfer mechanisms 18, such as electrical components and control components, to seal them from the environment.

A first embodiment for associating the modular energy transfer mechanism 18 with the drive member 14 is shown in FIG. 10. In this embodiment, the interface between the modular energy transfer mechanisms 18 and the drive member 14 comprises a gear 20 in each of the modular energy transfer mechanisms 18 for engaging a corresponding gear 22 on the drive member 14 for transferring energy from the drive member 14 to the modular energy transfer mechanisms 18. Rotation of gear 20 drives a generator 24 in the modular energy transfer mechanisms 18, via gear 25, to generate electricity.

Gears 20, 22 and 25 are exposed to the underwater environment and are therefore formed from a substantially non-corrosive material, suitably a protected metal or a resilient metal such as admiralty bronze or stainless steel. In other non-illustrated embodiments, however, only gears 20 and 22 are exposed to the underwater environment. In such embodiments, gear 20 is mounted on a shaft that extends through a seal in a housing of the modular energy transfer mechanism 18, and gear 25 is operatively engaged with the shaft, either directly or via one or more intermediate gears, Similarly, in other non-illustrated embodiments without intermediate gear 20, a larger diameter version of gear 25 may be used, which extends through the modular energy transfer mechanism housing to engage gear 22 directly, such that both gear 22 and gear 25 are exposed to the underwater environment.

A further embodiment for associating the modular energy transfer mechanisms 18 with the drive member 14 is shown in FIG. 11. In this embodiment, the modular energy transfer mechanisms 18 comprise a stator 26 and oscillation of the drive member 14 drives a rotor 28 associated with the stator 26 to generate electricity. In the illustrated embodiment, a plurality of permanent magnets 30 are circumferentially spaced about the drive member 14, such that the drive member 14 itself forms the rotor 28. The modular energy transfer mechanisms 18 are substantially completely sealed by an external housing 32. Accordingly, components inside the housing 32 do not need to be formed from water/seawater resistant materials, which may reduce costs.

A yet further embodiment for associating the modular energy transfer mechanisms 18 with the drive member 14 is shown in FIG. 12. This embodiment is similar to that of FIG. 11, where corresponding reference numerals indicate corresponding features with corresponding functions. However, in the embodiment of FIG. 12, the rotor 28 is a component driven by oscillation of the drive member 14. A step-up gear 34 is provided between the drive member 14 and the rotor 28 to increase the speed of the rotor. The step up gear may comprise a single stage, with one additional gear, as illustrated in FIG. 12, or a plurality of stages with a plurality of additional gears 34a, 34b, as illustrated in FIG. 12a. In FIG. 12a, the additional gears 34a, 34b operate in different planes and are interconnected by a shaft (not shown), with gear 34a being of smaller diameter and engaging gear drive member 14, and gear 34b being of larger diameter and engaging the rotor 28. The number of step up gears provided is selected to provide a gear ratio sufficient to facilitate turning the rotor 28 faster than the drive member 14.

A fourth embodiment for associating the modular energy transfer mechanisms 18 with the drive member 14 is shown in FIG. 13. In this embodiment, the modular energy transfer mechanisms 18 comprises a cylinder 36 and a piston 38 movable therein for actuation by oscillatory movement of the drive member 14. A push rod 40 is connected to the piston 38 and is driven by a cam profile 42 on an outer surface of the drive member 14. In other embodiments (not shown), however, the cam profile may be provided on a component driven by oscillation of the drive member 14. The push rod 40 extends through a housing 32 of the modular energy transfer mechanisms 18 and a seal 44 may be provided between the push rod 40 and the housing 32. An accumulator (not shown) is associated with the piston 38 and movement of the piston 38 pressurises a fluid in the accumulator. The accumulator is connected to a generator (not shown) and pressure from the accumulator is released, under the control of a control valve, to power the generator to generate electricity. An alternative solution (not shown) to having the push rod 40 extend through the housing 32 is to mount the cylinder 36 such that its end is adjacent the housing 32, and to use a single seal to seal between the cylinder 36 and the push rod 40, as well as between the push rod 40 and the housing 32. This alternative solution eliminates the need for an additional seal around the push rod 40.

In all of the embodiments of FIGS. 8-13, the modular energy transfer mechanisms 18 are buoyant in water, such that in underwater applications the modular mechanisms 18 may selectively be disassociated from the drive member 14 and allowed to float to a surface of the water. The buoyancy of the modular energy transfer mechanisms 18 is variable. The buoyancy is selectively reduced and increased, respectively, by partially flooding the modular energy transfer mechanisms 18 with water and evacuating some of the water from the modular energy transfer mechanisms 18. In some embodiments (not shown), oscillation of the drive member 14 actuates a pump to pump some of the water from the modular energy transfer mechanisms 18 to increase their buoyancy. In other embodiments (not shown), a compressed gas supply in the modular energy transfer mechanisms 18 is selectively released to displace some of the water in the modular energy transfer mechanisms 18 and reduce their buoyancy.

As shown in FIG. 14, a docking guide 46 is fixed relative to the base 12 and is adapted to guide the modular energy transfer mechanisms 18 into an operative position in which they are associated with the drive member 14. The docking guide 46 comprises angled walls for directing the modular energy transfer mechanisms 18 into the operative position. The docking guide 46 is also adapted to guide the modular energy transfer mechanisms 18 into engagement with an electrical and/or communications interface 48, on the base 12, for controlling the device 10. The interface 48 comprises an electrical outlet for outputting electricity generated by the modular energy transfer mechanisms 18.

The docking guide 46 also comprises a strut (not shown) about which a cable can be looped, such that with one end of the cable connected to a modular energy transfer mechanism 18 and a pulling force applied to the other end of the cable, the modular energy transfer mechanism 18 is drawn into an operative position in association with the drive member 14.

Referring to FIGS. 15 and 16 of the drawings, there is shown another embodiment of a device 100, applying similar principles to those of the embodiments of FIGS. 8-14, but adapted to capture energy from ocean waves. The device 100 comprises a base 112 adapted for stationary mounting relative to the water flow. A substantially cylindrical drive member 114 is movably connected to the base 112 and is adapted to be driven in oscillatory motion relative to the base 112 about a generally horizontal axis 115. An array of paddles 116 are connected to the drive member 114 to intersect with the ocean waves to drive the drive member 114 in oscillatory motion relative to the base 112. A plurality of wedge-shaped removable modular energy transfer mechanisms 118 are associated with the drive member 114 and adapted to be driven by the oscillation of the drive member 114. The modular energy transfer mechanisms 118 extend generally perpendicular to the axis 115, with their narrower ends being oriented toward the drive member 114. The modular energy transfer mechanisms 118 are independent, such that the device 100 can continue to transfer energy provided that at least one of the energy transfer mechanisms 118 is operable and installed.

The base 112, drive member 114 and paddle 116 are adapted to be substantially maintenance-free, or at least to require servicing at intervals much greater than those of the modular energy transfer mechanisms 118.

As with the embodiment of FIGS. 8 and 9, an interface 119 between the modular energy transfer mechanisms 118 and the drive member 114 of the device 100 of FIGS. 15 and 16 is exposed to the surrounding underwater environment. However, a housing is provided around environmentally sensitive components of the modular energy transfer mechanisms 118, such as electrical components and control components, to seal them from the environment.

The embodiments of FIGS. 10-13 are all suitable for associating the modular energy transfer mechanisms 118 with the drive member 114 of the device 100 of FIGS. 15 and 16. Also as with the earlier embodiments, the modular energy transfer mechanisms 118 are buoyant in water, such that in underwater applications the modular mechanisms 118 may selectively be disassociated from the drive member 114 and allowed to float to a surface of the water. The buoyancy of the modular energy transfer mechanisms 118 is variable as described above in the earlier embodiments.

In use, to service the device 100, a modular energy transfer mechanism 118 requiring servicing is disassociated from the drive member 114. The disassociated modular energy transfer mechanism 118 is then moved to an above-water location for servicing. The buoyancy of the modular energy transfer mechanism 118 is increased prior to or after disassociation with the drive member 114 to facilitate the moving step. The buoyancy is increased by evacuating some of the water from the modular energy transfer mechanisms 18 using one of the methods discussed above. In embodiments that increase buoyancy using a compressed gas supply, the gas is replaced during servicing of the modular energy transfer mechanism 118. The disassociated modular energy transfer mechanism 118 is guided away from other components of the device 100 during its being raised to the surface for servicing to reduce the risk of the disassociated modular energy transfer mechanism 118 inadvertently contacting and being damaged or damaging other components of the device 100. Disassociation guide wires (not shown) are attached to the disassociated modular energy transfer mechanism 118 and a pulling force is applied to the guide wires to facilitate safe movement of the disassociated modular energy transfer mechanism 118 toward the surface of the water.

The disassociated modular energy transfer mechanism is replaced with a serviceable modular energy transfer mechanism. The buoyancy of the replacement serviceable modular energy transfer mechanism is temporarily reduced to facilitate its sinking movement into association with the drive member 114. As previously discussed, the buoyancy of the serviceable modular energy transfer mechanism is reduced by at least partially flooding the modular energy transfer mechanism with water. As shown in FIG. 17, installation guide wires are, looped around a strut (not shown) fixed relative to the base to facilitate movement of the serviceable modular energy transfer mechanism into association with the drive member. Drawing on the installation guide wires draws the serviceable modular energy transfer mechanism into association with the drive member. Alternatively, installation guide wires (not shown) may extend from a winch (not shown) fixed relative to the base 112 for connection to the serviceable modular energy transfer mechanism to draw the serviceable modular energy transfer mechanism into association with the drive member 114.

Servicing of the device 10 of FIGS. 8-14 is achieved using a similar method as described above for the device 100 of FIGS. 15-17. However, the docking guides 46 of the device 10 of FIGS. 8-14 facilitate the servicing process.

It will be appreciated that the illustrated water energy capturing devices 10, 100 of FIGS. 8-17 have reduced downtime compared to similar conventional devices, due to the independent and modular nature of the modular energy transfer mechanisms 18, 118, one or more of which can be removed for servicing whilst those remaining continue to operate. The modular nature of the modular energy transfer mechanisms, along with the docking guides and servicing process described above, also reduce the amount of diver interaction required to service the devices 10, 100. The modular nature of the modular energy transfer mechanisms also allows the modular energy transfer mechanisms to be removed to an above-water environment for servicing, which makes servicing much simpler and safer, and obviates the requirement for divers and specialised tools suitable for underwater use. It also allows for a single energy capturing device to be operated with a varied number of modular energy transfer mechanisms, thereby allowing the energy transfer to be better matched with the energy source.

It will be appreciated by persons skilled in the art that numerous variations and/or modifications may be made to the embodiments of FIGS. 8-17 without departing from the broad general scope of the present disclosure. These embodiments are, therefore, to be considered in all respects as illustrative and not restrictive. Examples of potential modifications include, but are not limited to:

the modular energy transfer mechanisms may be of other shapes;
the modular energy transfer mechanisms may be stacked horizontally or vertically;
the modular energy transfer mechanisms may be aligned in parallel, rather than radially along a shaft; and/or
the modular energy transfer mechanisms may be adapted to pump or pressurise seawater for the purpose of doing useful work, generating electricity or desalinating seawater.

The invention claimed is:

1. A device for capturing energy from a moving fluid, said device comprising:
a base adapted for stationary mounting relative to a fluid flow;
a drive member movably connected to said base and adapted to be driven in oscillatory motion relative to said base;
at least one paddle connected relative to the drive member, wherein fluid flow past the paddle drives the drive member in oscillatory motion relative to the base;
a plurality of removable modular energy transfer mechanisms associated with said drive member and adapted to be driven by the oscillation of said drive member,
a mechanism for independently disassociating each removable modular energy transfer mechanism from the drive member, such that, when so disassociated, oscillation of the drive member does not actuate the disassociated removable modular energy transfer mechanism or mechanisms;
wherein the modular energy transfer mechanisms are independent of each other, such that the device can continue to transfer energy provided that at least one of the energy transfer mechanisms is operable and installed so as to be operably associated with the drive member.

2. The device according to claim 1, wherein the oscillatory motion of the drive member is oscillatory rotational motion about a first axis.

3. The device according to claim 1, wherein an interface between the at least one modular energy transfer mechanism and the drive member is exposed to the surrounding environment.

4. The device according to claim 1, wherein the at least one modular energy transfer mechanism comprises at least one hydraulic cylinder for actuation by oscillatory movement of the drive member.

5. The device according to claim 4, wherein one end of the hydraulic cylinder is translationally fixed with respect to the base and the other end of the hydraulic cylinder is hingedly connected to a movable member that is adapted to move by oscillation of the drive member.

6. The device according to claim 5, wherein the hydraulic cylinder is at least partially housed in a pressure vessel.

7. The device according to claim 6, wherein the modular energy transfer mechanism comprises a locking mechanism, which extends from the pressure vessel, for selectively engaging a portion of the drive member spaced apart from the first axis.

8. The device according to claim 7, wherein the movable member comprises a mounting member fixed relative to the locking mechanism.

9. The device according to claim 8, wherein the mounting member is located inside the pressure vessel.

10. The device according to claim 6, wherein the translationally fixed end of the, or each, said hydraulic cylinder extends from the pressure vessel.

11. The device according to claim 6, wherein the pressure vessel is hingedly connected relative to the base.

12. The device according to claim 6, comprising a plurality of the modular energy transfer mechanisms connected to the drive member in parallel.

13. The device according to claim 5, comprising at least one oscillatible coupling extending from the movable member to connect the movable member to the drive member, such that oscillation of the drive member oscillates the movable member about the first axis.

14. The device according to claim 13, wherein the or each said coupling is directly engaged with the drive member.

15. The device according to claim 13, wherein the or each said coupling is engaged with the drive member by a said coupling of an adjacent modular energy transfer mechanism or by an adapter.

16. The device according to claim 13, comprising two of the hydraulic cylinders, each connected at one end to a respective diametrically opposite side of the movable member.

17. The device according to claim 13, comprising a clutch between the drive member and the or each said hydraulic cylinder to allow the or each said hydraulic cylinder to be disengaged from the drive member.

18. The device according to claim 4, comprising an accumulator associated with the hydraulic cylinder, such that actuation of the hydraulic cylinder pressurises a fluid in the accumulator.

19. The device according to claim 18, wherein the accumulator is connected to a generator and pressure from the accumulator is released to power the generator to generate electricity.

20. The device according to claim 1, wherein the modular energy transfer mechanism is buoyant in water.

21. The device according to claim 1, wherein the modular energy transfer mechanism has a buoyancy that is variable.

22. A device for capturing energy from a moving fluid, said device comprising:
  a base adapted for stationary mounting relative to a fluid flow;
  a drive member movably connected to said base and adapted to be driven in oscillatory motion relative to said base;
  at least one paddle connected relative to the drive member, wherein fluid flow past the paddle drives the drive member in oscillatory motion relative to the base; and
  at least one removable modular energy transfer mechanism associated with said drive member and adapted to be driven by the oscillation of said drive member,
  wherein the modular energy transfer mechanisms are connected to the drive member in series.

23. A modular energy transfer mechanism for a device for capturing energy from an oscillating drive member, the modular energy transfer mechanism comprising:
  at least one hydraulic cylinder for actuation by oscillatory movement of the drive member, one end of the hydraulic cylinder being adapted for translationally fixed mounting and the other end of the hydraulic cylinder being adapted for hinged connection to a movable member that is adapted to move by oscillation of the drive member; and
  a mechanism for disassociating the hydraulic cylinder from the drive member, such that, when so disassociated, oscillation of the drive member does not actuate the hydraulic cylinder.

24. The device according to claim 23, comprising an accumulator associated with the hydraulic cylinder, such that actuation of the hydraulic cylinder pressurises a fluid in the accumulator.

25. The device according to claim 23, comprising at least one oscillatible coupling extending from the movable member to connect the movable member to the drive member, such that oscillation of the drive member oscillates the movable member about a first axis.

26. The device according to claim 25, wherein the or each said coupling is directly engageable with the drive member.

27. The device according to claim 25, wherein the or each said coupling is engageable with the drive member by a said coupling of an adjacent modular energy transfer mechanism or by an adapter.

28. The device according to claim 23, comprising a clutch between the drive member and the, or each, said hydraulic cylinder to allow the, or each, said hydraulic cylinder to be disengaged from the drive member.

29. The device according to claim 23, wherein the modular energy transfer mechanism is connectable in series to one or more other said modular energy transfer mechanisms.

30. The device according to claim 23, wherein the or each said hydraulic cylinder is at least partially housed in a pressure vessel.

31. The device according to claim 30, wherein the modular energy transfer mechanism comprises a locking mechanism, which extend from the pressure vessel, for selectively engaging a portion of the drive member spaced apart from a first axis about which the drive member rotationally oscillates.

32. The device according to claim 30, wherein the movable member comprises a mounting member fixed relative to the locking mechanism and located inside the pressure vessel.

33. The device according to claim 30, wherein the pressure vessel is adapted for hinged connection relative to a fixed base.

34. The device according to claim 30, wherein the modular energy transfer mechanism is connectable in parallel to one or more others of the modular energy transfer mechanisms.

* * * * *